May 14, 1957     H. A. ROBINSON     2,791,992
SINGLE POPPET VALVE INTERNAL COMBUSTION ENGINE
Filed Sept. 1, 1950     5 Sheets-Sheet 1

INVENTOR
Hugh A. Robinson

BY Franklin S. Long
ATTORNEY

May 14, 1957   H. A. ROBINSON   2,791,992
SINGLE POPPET VALVE INTERNAL COMBUSTION ENGINE
Filed Sept. 1, 1950   5 Sheets-Sheet 2

INVENTOR
Hugh A. Robinson
BY Franklin S. Long.
ATTORNEY

May 14, 1957   H. A. ROBINSON   2,791,992
SINGLE POPPET VALVE INTERNAL COMBUSTION ENGINE
Filed Sept. 1, 1950   5 Sheets-Sheet 3

INVENTOR
Hugh A. Robinson
BY Franklin S. Long   ATTORNEY

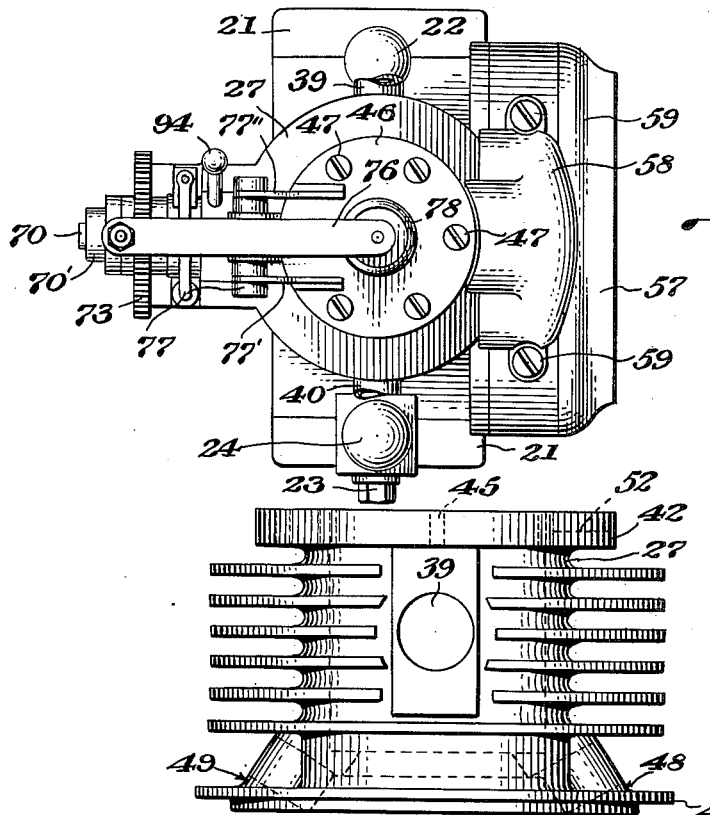
Fig. 4.
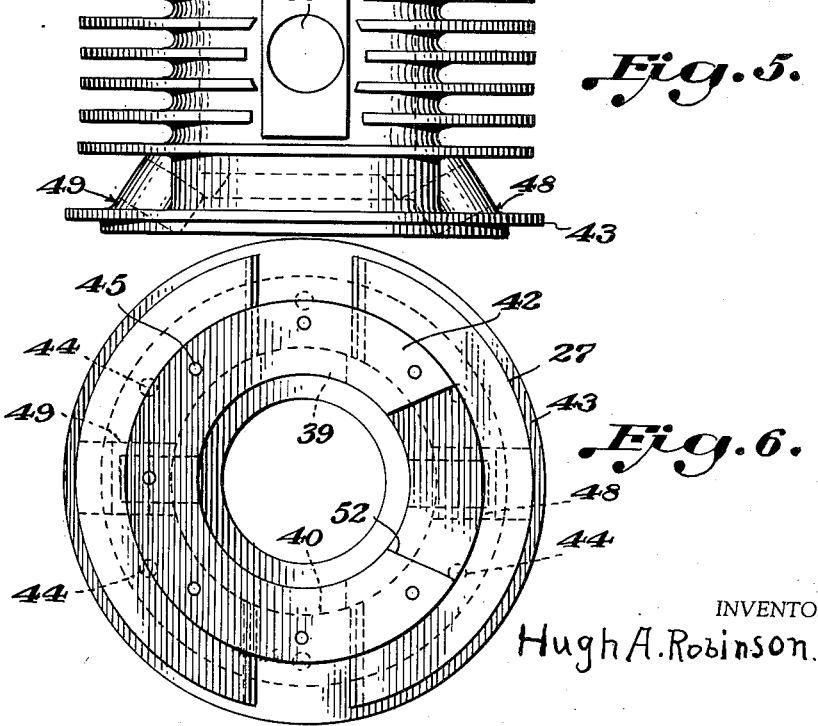
Fig. 5.
Fig. 6.
INVENTOR
Hugh A. Robinson.
BY Franklin S. Long. ATTORNEY May 14, 1957   H. A. ROBINSON   2,791,992
SINGLE POPPET VALVE INTERNAL COMBUSTION ENGINE
Filed Sept. 1, 1950   5 Sheets-Sheet 5
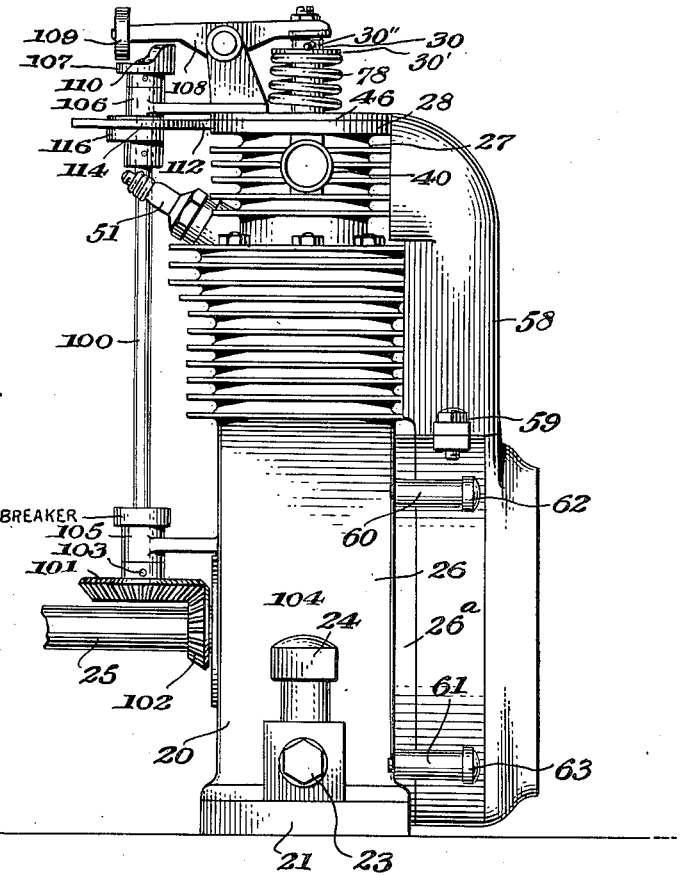
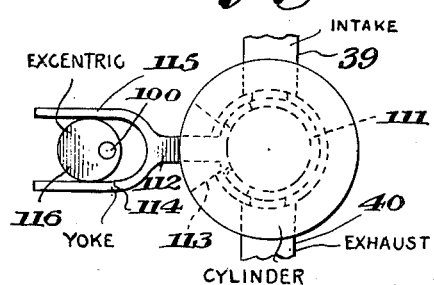
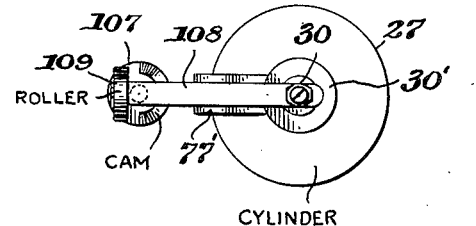
Hugh A. Robinson, INVENTOR
BY Franklin S. Long.
ATTORNEY

United States Patent Office 2,791,992
Patented May 14, 1957

2,791,992

SINGLE POPPET VALVE INTERNAL COMBUSTION ENGINE

Hugh A. Robinson, Takoma Park, Md., assignor of one-half to H. H. Robinson, Silver Spring, Md.

Application September 1, 1950, Serial No. 182,843

6 Claims. (Cl. 123—79)

This invention relates to a four cycle internal combustion engine of the so-called single valve variety in which there is a single poppet valve in an overhead engine and a distribution or control valve to control both the intake and exhaust ports so that both the intake fuel and the burst gases are guided and propelled to pass by and over the single poppet valve alternately by a cam controlled mechanism. My control valve comprises an oscillating cylindrical sleeve having its axis, preferably, coaxial with both the poppet valve on the one hand and the cylinder and piston of the engine on the other hand. In my engine both the engine head and the oscillating sleeve valve are provided with intake and exhaust ports.

It is an object of my invention to provide a high compression engine comprising in combination a comparatively large poppet valve providing for ample intake and exhaust space which results in a very efficient and high power engine.

It is an object of my invention to actuate the poppet valve by the use of a spring biased rocker arms or lever, that is, the spring for the poppet valve actuates the lever in one direction and is operated in the opposite direction by a push rod in contact with a specially contoured rotating cam which in turn are actuated by spur gears suitably mounted on the crankshaft and an auxiliary shaft.

It is also an object of my invention to provide a novel and special means for oscillating the sleeve valve which comprises a lever fulcrumed on the engine cylinder or other special construction. The lower end of the lever being bifurcated and embracing an eccentric on the auxiliary shaft. The oscillating sleeve control valve is provided with a laterally projecting arm of suitable length extending through a slotted or recessed portion of the engine head and is connected to the lever at its upper end by a link. Ball and socket joints connect the link to the lever and to the arm respectively. The link and lever mechanism provides positive actuation in both directions throughout its arcuate oscillating movement.

It is also an object of my invention to provide synchronized timing for the intake and exhaust gases which is accomplished by the oscillating sleeve control valve and its ports in cooperation with the intake and exhaust ports of the engine head and also in further cooperation with the timing gears and their particular connections with the poppet valve and the sleeve valve. In the synchronized timing the control sleeve valve closes the exhaust port just before the intake port is opened. The intake port is opened by the sleeve valve substantially at the beginning of the suction stroke and closes when the suction stroke is completed. When the piston reaches the end of the suction stroke the poppet valve closes.

It is also an object of my invention to provide favorable conditions for heating the intake gases or fuel and to simultaneously extract heat from the poppet valve and its seat to prevent overheating of the same. The heating effect of the exhaust gases takes place during the exhaust stroke of my four cycle engine. The heating effect takes place on the one hand during the explosion or burning stroke and the scavenging stroke, on the other hand the cooling effect on the poppet valve takes place during the suction or intake stroke and continues throughout, at least, a major portion of the compression stroke. The cooling effect of the fresh gases on the poppet valve results in lowering the temperature of the valve to such an extent that no overheating of the valve occurs and no preignition of the fresh gas mixture occurs from what is commonly known as a hot exhaust valve which on ordinary or conventional four cycle combustion engines heats to a cherry red from the heat of combustion and exhaust of burnt gases.

It is a further object of my invention to produce a high compression engine having a ratio as high as 15 to 1 without preignition and thereby use advantageously any of the high or highest octane gases now in production. This superior accomplishment results from high compression plus the heat-control feature above explained. My engine operates most efficiently and is economical in the use of gasoline at any suitable speed of operation.

My engine may be either air or water cooled and exhaustive tests have shown that the cylinder and cylinder head runs at a temperature of less than half of that of an ordinary four cycle internal combustion engine with the result that the deterioration of the poppet valve, the overheating and fouling of the ignition system is proportionately minimized.

In my drawings I have disclosed some embodiments of my invention and said embodiments are merely illustrative of my invention and the principles thereof. These drawings are part of my application for Letters Patent.

In the drawings:

Fig. 4 is a plan view of my engine as disclosed in Fig. 2.

Fig. 5 is a view in side elevation of the engine head which comprises one section of the body of the engine of Fig. 2.

Fig. 6 is a plan view of the engine head disclosed in Figs. 2 and 5.

Fig. 14 is a view in side elevation depicting in particular a modified actuating mechanism for the engine valves.

Figure 9:
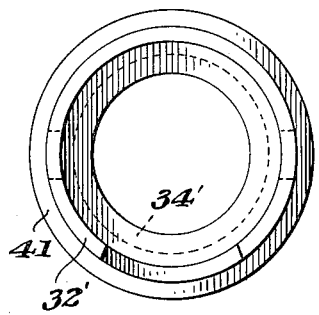
Fig. 9 is a plan view of the complete lining disclosed in Fig. 8 but displaced axially ninety degrees from the subject matter of Fig. 8.

Fig. 15 discloses in a plan view elements of the actuating mechanism for the sleeve valve.

Fig. 16 discloses in a plan view some of the elements of the actuating mechanism for the poppet valve.

The reference characters identify the parts in both the drawings and specification.

The body 20 of the engine is provided with a base 21, a crankcase, breather tube and cap 22, a drain port and plug 23 and an oil filler tube and cap 24. Within the crankcase is a crankshaft 25 of the balanced variety.

Figure 1:
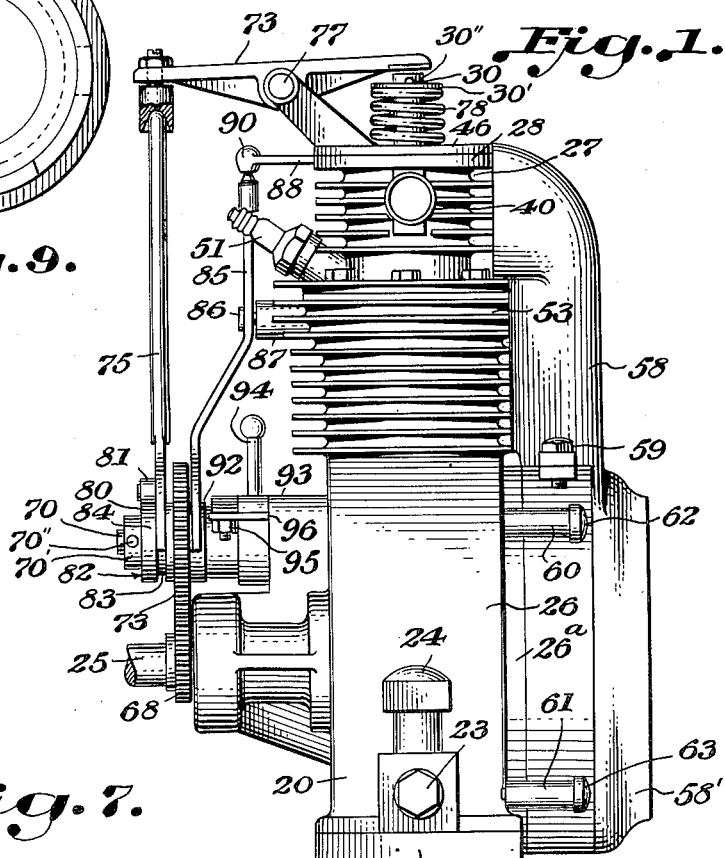
Fig. 1 is a view in side elevation of my completed internal combustion engine.
Figure 7:
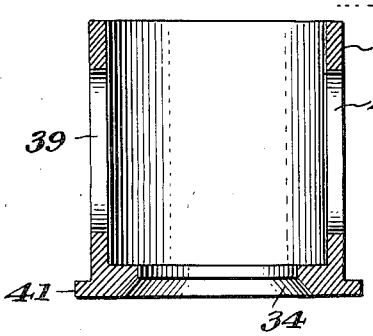
Fig. 7 is a vertical sectional view of a lining for the engine head depicting intake and exhaust ports as well as the valve seat for the poppet valve.
Figure 8:
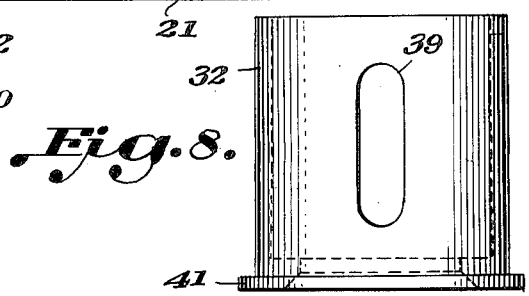
Fig. 8 is a view in side elevation of the complete lining displaced axially ninety degrees from the subject matter of Fig. 7.
Figure 2:
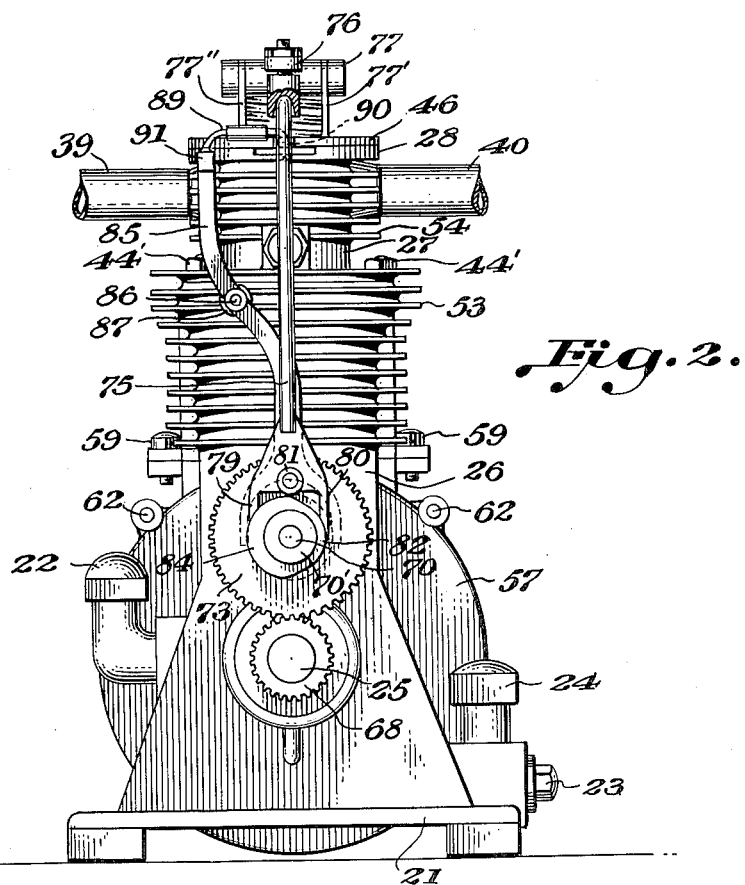
Fig. 2 is a view in end elevation depicting in detail the control system for the valves and also disclosing a slight modification of the crankcase construction.
Figure 3:
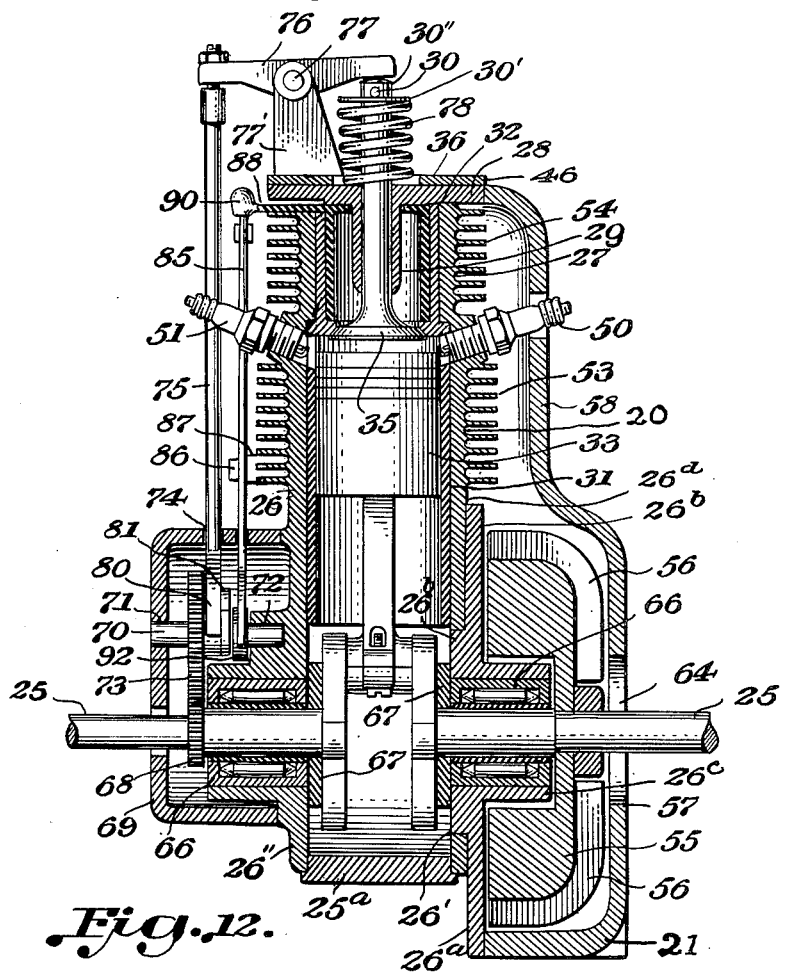
Fig. 3 is a sectional view taken in a plane located centrally both vertically and longitudinally of my engine, when the engine head and cylinder are constructed as a single piece and further discloses a modified base construction.
Figure 12:
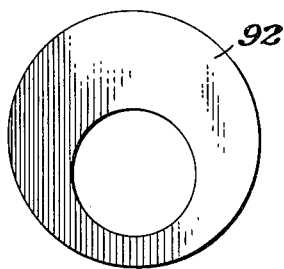
Fig. 12 is an elevational view of a cam or eccentric comprising an element of the actuating mechanism for the sleeve valve.

The body 20 of the engine, Fig. 3, is made up primarily of a one-piece casting of aluminum or aluminum alloy. Figs. 1, 2 and 14 are made up of sections, comprising a lower combined section 26 including both the cylinder and the major portion of the crankcase. A cylinder head 27 is bolted to the cylinder preferably in axial alinement therewith and a cover section 28 bolted or otherwise secured to the top of the cylinder head 27.

My crankcase is not the conventional variety, since the crankshaft 25 can be inserted into the crankcase section 26 endwise. One end of the crankcase section 26 is provided with a circular opening 26' large enough to receive the crankshaft 25. A closure 26a for the opening 26' comprises a plate having a pair of hubs 26b and 26c respectively. The hub 26b fits snugly into the circular opening 26' and this pair of hubs and the closure 26a support a roller bearing 66 for the crankshaft 25. The closure 26a is bolted to the main section 26 of the engine.

When the engine is made of aluminum or aluminum alloy a steel liner or lining is used in both the main cylinder and the cylinder head.

In Fig. 3 the cylinder 26d and the cylinder head 27 are cast in one piece of aluminum or aluminum alloy. The diameter of the cylinder head 27 is smaller than the diameter of the cylinder 26d. By this arrangement the head 27 can be bored and finished to receive the liner 32 including its annular flange 41. The diameter of the flange 41 is substantially equal to the finished diameter of the cylinder 26d so that the upper end of liner 31 of the cylinder abuts against the flange 41. Both liners are pressed into position and because of this tight fit the liners are retained in place unless removed by pressure means for replacement by new ones.

In order to provide for the boring and finishing of the cylinder head and cylinder a removable closure 25a is provided in the bottom of the crankcase 26".

The cylinder head closure 28 is provided with a depending tube or collar 29 constituting a guide for the poppet valve stem 30 of the valve 35.

Both the cylinder and cylinder head are provided with suitable linings or liners 31 and 32 respectively made of suitable material such as: a suitable steel or steel alloy. The liner 31 receives the reciprocating piston 33 which is connected to the crankshaft 25 in a conventional manner. The liner 32 is provided on its lower end with an annular flange 41 and a beveled circular valve seat 34 complemental to the seating portion of the poppet valve 35.

Within the liner 32 of the cylinder head 27 is located a cylindrical control sleeve valve 36 which is provided with an intake port 37 for the fuel gas and an exhaust port 38 for the burnt gases. Both the cylinder head 27 and its liner 32 are provided with inlet and exhaust ports connected to conveyor tubes or conduits 39 and 40 respectively.

The ports of the sleeve control valve and the engine head and liner are so arranged and synchronized that during the major portion of the intake or suction stroke the intake port is open to provide for the entrance of fuel gas into the cylinder. Both the control valve and the poppet valve are closed during both the compression and combustion stroke. When the combustion stroke is completed both the sleeve valve and poppet valve open immediately to provide for a free and rapid displacement of the burnt gases during the scavenging stroke. When the scavenging stroke is completed the exhaust port is closed by the sleeve valve and the intake port is immediately opened by the sleeve valve to provide for free admission of a fresh charge of fuel gas. The poppet valve remains open during both the scavenging and intake strokes.

In order to minimize the volumetric space or pocket defined by the internal dimensions of the sleeve valve 36 and the guide collar 29, it is contemplated that the sleeve valve, the liner 32, the collar and the cylinder head 27 can be axially shortened in accordance with acceptably good engineering practice. The collar 29 can be made thick or thin if necessary to provide for a space or pocket which is of a size at least equal to the necessary flow of gases to and from the engine cylinder.

The liner 32 including the poppet valve 35 takes the entire thrust pressure of the explosion stroke. For this reason the liner 32 having the flange 41 provision has been made to firmly retain the liner 32 in its fixed position as previously explained herein.

The cylinder head 27, Figs. 5 and 6, is provided with an upper terminal flange 42 and a lower terminal flange 43. The lower terminal flange 43 is provided with apertures 44 to receive suitable fastening means such as bolts or nuts and bolts 44' whereby the head 27 is firmly secured to the cylinder 36. The terminal flange 42 is provided with bores 45 which are tapped or screw threaded whereby the closure section 28 is firmly bolted to the head 27. The base 46, Fig. 4, of the rocker arm bracket is also bolted to the engine or engine head and these same bolts 47 preferably pass through the closure 28 and into the tapped bores 45 to firmly secure these parts together.

The cylinder head is also provided with enlargements or bosses 48 and 49 located on and above the terminal flange 43. These bosses are apertured and tapped to receive the spark plugs 50 and 51. The recess 52 receives the oscillating arm of the sleeve valve 36.

It is observed that I have disclosed an air cooled engine using fins 53 on the cylinder, and fins 54 on the head 27 in combination with a blower or fan. A flywheel 55 is keyed on or otherwise secured on the crankshaft 25 and it carries fan blades 56. A blower or fan housing having a lower section 57 and an upper section 58 is bolted together as indicated at 59. The housing is provided with apertured ears 60 and 61 whereby bolts 62 and 63 secure the housing to the engine preferably by using tapped bores in the engine. The housing is provided with an air inlet 64. The top of the housing is closed but the side of the housing adjacent the engine is open so that air propelled by the fan can impinge directly on one side of the engine and the fins thereof.

While I have shown an air cooled engine it is also contemplated that a water cooling system involving a suitable water jacket construction of substantially a conventional engineering design may be used.

The crankshaft 25 is mounted and supported by roller bearings 66. In order to prevent longitudinal displacement of my crankshaft 25 I use bronze washers 67 fitted on the crankshaft and located between each crank and the next adjacent bearing.

Figure 13:
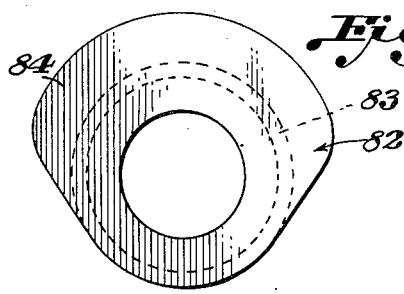
Fig. 13 is a view in side elevation of a specially constructed combined cam and guide means constituting an element of the actuated mechanism for the poppet valve.

The actuating and control mechanism for the poppet valve 35 and the sleeve valve 36 is operatively connected to the crankshaft 25 which has fixed thereon a spur gear 68. A protecting and supporting housing 69 is suitably fastened to the engine. An auxiliary shaft 70 is mounted and supported at one of its ends in a bearing 71 of said housing while the opposite end of said auxiliary shaft is rotatably mounted in a bearing 72 supported by a boss on said engine. A spur gear 73 is fixedly mounted on said auxiliary shaft and engages the gear 68 on said crankshaft. The gear 68 has half as many gear teeth as the gear 73, thus the propelling gear on the crankshaft has a two to one ratio relative to the gear 73. The housing 69 has in its top portion an aperture 74 which may constitute a guide for the reciprocating rod 75 which actuates the rocking lever 76 supported on a pair of upstanding ears 77' and 77" on the base of the bracket 46 and is fulcrumed on pivot pin 77 to open the poppet valve 35 against the tension of the compression spring 78 which normally maintains the valve closed. The spring 78 bears against the closure 28 at one of its ends and its opposite end bears against the washer 30', said washer being maintained on the stem 30 by suitable means such as a pin 30" or the like which positively engages the stem 30 in a fixed position. The lower end portion of the rod 75 is bifurcated to define parallel legs 79 and 80 and is also provided with a roller 81 mounted rotatively intermediate the parallel legs but just above the same. The legs and roller engage a specially constructed and contoured cam 82, Fig. 13, mounted in suitable relation to the gear 73 on the auxiliary shaft 70. The cam 82 is provided with a concentric portion 83 which is in constant physical contact with the legs 79 and 80 to maintain the rod 75 in a vertical position and also maintain the roller 81 in the path of the large actuating lobe 84. The lobe 84 is sufficiently large and extensive enough to maintain the poppet valve 35 open during both the scavenging and intake strokes of the piston 33.

The lever 85 is fulcrumed intermediate of its ends on a pivot 86 supported on a boss 87 secured to and extending laterally from the engine cylinder 53. The upper end of the lever 85 is removably connected to the arm 88 of the sleeve valve 36 by a link 89. The connections between the link 89 and the lever and arm are preferably ball and socket joints 90 and 91. It is merely essential that the joints be articulate and afford limited movements of universal quality. An eccentric 92 is fixed on the auxiliary shaft 70. The eccentric 92 is located in close proximity to the cam 82 and is parallel to it. The lower end portion of the lever 85 is bifurcated to span the eccentric and engage the same on diametrically opposed points or positions on the eccentric. It is self-evident that the cam 82 and the eccentric 92 must be accurately located and synchronized to produce the opening and closing of the ports by the valves in an operative sequence to supply fuel to the cylinder and to provide for the exhaust of the burnt gases, as well as provide for the compression and burning or combustion strokes of my four cycle engine. The opening and closing of the ports in relatively time sequence is of the utmost importance for economy and for the most efficient operation of the engine.

It is to be observed that Fig. 1 discloses an electrical make and break mechanism to produce a spark for the ignition of the gas when compressed in the cylinder substantially at its peak or highest point of compression. This make and break mechanism is conventional and is located in a housing 93 which encloses a portion of the auxiliary shaft 70. This mechanism is actuated by the auxiliary shaft 70 and is provided with an adjusting means to control the position of the conventional cam to produce accurate timing of the spark. The adjusting means includes an upright arm or handle 94 which is suitably connected to the cam.

It is to be further observed in Fig. 1, that the timing mechanism for the valves while involving the use of substantially the same constructional elements is arranged and assembled differently from that set forth in Figs. 2 and 3. Fig. 3 does not show the make and break mechanism but it does show a timing mechanism for the valves in which the eccentric 92 is located on the shaft 70 in close proximity to the engine cylinder 26. The specially constructed cam 82 with its specially contoured cam lobe 84 is located next adjacent to the eccentric 92 with the lobe 84 and the antifriction roller 81 between the reciprocating rod 75 and the lever 85. The gear wheel 73 is mounted against the controlling concentric guide 83. The eccentric, the cam and the gear wheel 73 are preferably fixed on the shaft 70 by keys.

Fig. 1 does not show a housing for the gear wheels 68 and 73 and their adjacent cooperating parts. The gear wheel 73 is fixed on the shaft 70 and is located between the eccentric 92 and the cam 82. The lobe 84 and the antifriction roller engage the outer surface portion of reciprocating rod 75.

The collar 70' is fastened on the shaft 70 by a pin 70" extending through both the shaft 70 and the collar 70' to prevent accidental displacement of the cam 82 on the shaft 70.

In order to provide for the lubrication of the oscillating control and distributing sleeve valve and other parts, it is accomplished by adding a very small amount of lubricant to the fuel or by any other suitable and conventional force feed lubricating system. The crankshaft and its bearing together with the connection or rods and piston or pistons are lubricated by either the crankcase splash system or by any suitable conventional force feed oiling system or both of them combined. A branch feed from the force feed system can be installed to lubricate the rocker arms or lever bearing or bearings.

Figs. 14, 15 and 16 collectively illustrate an engine and disclose a modification of the timing mechanism for the valves.

In this mechanism an upright auxiliary shaft 100 is used in lieu of a reciprocating rod 75, a lever 85 and a horizontal auxiliary shaft 70. The shaft 100 is provided with a gear 101 engaged by the actuating gear 102 fixed on the crankshaft 25. The gear 101 has two times as many gear teeth, or its equivalent, as gear 102 so that the crankshaft 25 makes two complete revolutions in the same time that the auxiliary shaft 100 makes one complete revolution. The gears 101 and 102 are fixed on their respective shafts by any suitable means, such as cross pins 103 and 104. The shaft 100 is supported in spaced bracket bearings 105 and 106 respectively. The shaft 100 is maintained against longitudinal displacement by the cam construction 107 fastened on the upper end of shaft 100 and the gear 101 both of which bear against the remote surfaces of the bracket bearings 105 and 106. The rocker arms or lever 108 is pivoted intermediate its ends between bracket arms extending upwardly from the closure 28. One arm of the lever 108 bears against the uppermost end of the poppet valve stem 30 and the end of the other arm is provided with an antifriction wheel or roller 109 which engages the cam construction 107. The cam construction 107 is provided with an upright cam lobe 110 which at its base or longest portion covers an extent of at least 180°. The cam lobe 110 rotates in a circular path and also in the path of the roller 109. The contour and extent of the lobe 110 is such that it will maintain the poppet valve open throughout the period of time required by the scavenging and intake strokes of the piston.

The oscillating sleeve valve 111 is provided with an arm 112 extending laterally and outwardly through a recess 113 located in the top edge portion of the engine head 27. The outer end portion of the arm 112 is bifurcated constituting a yoke having the legs 114 and 115. An eccentric 116 is suitably fixed on a shaft 100 and located between the legs of the yoke, whereby rotation of the shaft and eccentric will oscillate the arm 112 and the sleeve valve 111 to alternately open and close the exhaust and intake ports in synchronized relation to the opening and closing of the poppet valve.

One end of the lever 108 is provided with an adjusting means comprising a set screw 117 which is threaded into a tapped aperture of the lever 108 and is arranged in substantially and normally in coactual relation with the stem 30 of the poppet valve. The set screw 117 is long enough to receive a lock nut 118. The set screw 117 is preferably provided with a screw driver kerf 119.

Figure 10:
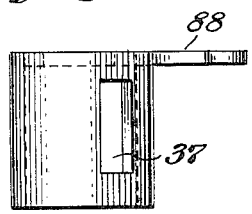
Fig. 10 is a side elevational view of the control sleeve valve which when assembled oscillates within the lining of the cylinder head.

It is to be observed that the sleeve or control valve 36 of Figs. 3 and 10 including the laterally extending arm 88 are substantially of uniform thickness throughout their full extent. Likewise the sleeve or control valve 111 and the laterally extending arm 112, Figs. 14 and 15, are of substantially uniform thickness throughout their full extent. This principle of uniform thickness of material lends itself to substantially uniform distribution and dissipation of heat. This quality of substantially uniform dissipation of heat is an important and desirable function in internal combustion engines.

A conventional electrical break and make mechanism to produce the ignition is installed on the shaft 100 and is designated as a "breaker."

The subject matter of Fig. 14, except as explained above, is identical in all essential parts with the engines disclosed in Figs. 1, 2 and 3.

My cylindrical control valve is solid and tubular, i. e. it is not a resilient split sleeve or cylinder.

My oscillating solid, cylindrical, sleeve or tubular control valve 36 is substantially a floating valve, i. e. it does not require a machine finish internally since its internal contour is free and does not contact any guiding or limiting surface portion of the cylinder head. The upper surface portion and the lower edge are preferably machine finished. The outer cylindrical surface portions are machine finished which contact the interior of the cylinder head or its lining. Ample clearance is provided between my oscillating sleeve 36 and the cylinder head. The free oscillating function of my sleeve valve is different than a simple rotating function and lends itself to a most efficient lubrication by producing different alternating vector forces.

It can now be readily understood that I have produced a new relation or new combination of an oscillating sleeve valve control means and a new actuating means therefor. The space or chamber defined by the sleeve valve 36 and the guide collar for the poppet valve stem is just large enough to provide for the efficient flow of intake and exhaust gases.

Since the drawings are merely illustrative of my invention it is self evident that I may resort to various changes in detail within the scope of the appended claims.

Figure 11:
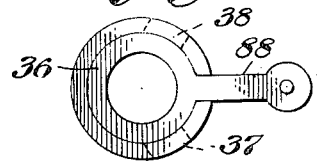
Fig. 11 is a plan view of the sleeve valve of Fig. 10.

In Figs. 10 and 11 it is to be noted that the arm 88 is integral with a ring in the top portion of the oscillating control valve 36. The upper end of the tubular cylindrical control valve is recessed both arcuately throughout a major arc and radially whereby the ring and arm 88 are pressed-fitted into the upper tubular recessed portion thereof. This manner of adding the arm 88 to the valve body 36 appears to be most feasible and represents my preferred construction, even if the arm could be attached to the sleeve by other means, such as, brazing or welding.

The adjusting means, Figs. 14 and 16, for the rocking lever 108 and the valve stem 30 comprises a set screw tapped into the lever arm and extending therethrough into close proximity to the top of the valve stem 30. The set screw is provided with a screw driver kerf in its upper end. In order to maintain the adjusted position of the set screw a lock-nut is applied to the set screw and impinges against one arm of the rocking lever 108 as clearly shown.

The outer end of the rocking arm, Figs. 1, 2 and 3, is provided with a connecting means comprising a body preferably cylindrical having a reduced threaded portion at one of its ends constituting a bolt. The opposite end of the body is provided with a frusto-conical recess coaxial with said bolt, said recess movably receiving the upper end portion of the push rod. This connection with the lever arm may be adjusted by the use of washers or shims detachably located between the arm and the body. The bolt on the upper end of the body may be tapped into its supporting arm and have a lock-nut applied thereto impinging against said arm and thereby maintain a fixed adjustment between the body and the arm.

Having fully disclosed my invention what I claim is:

1. In an internal combustion engine comprising a cylinder, a cylinder head coaxial with said cylinder and secured thereto, a closure detachably secured on said cylinder head, a poppet valve spring biased to a closed position, an oscillating solid, tubular and cylindrical control valve in said head, said control valve being externally machine finished, said cylinder head being internally machine finished, whereby said control valve may be accurately fitted, with sufficient clearance, coaxially within said cylinder head, said head and control valve having cooperating intake and exhaust ports; mechanism on said engine and constituting a part thereof for actuating said control valve and said poppet valve in synchronism, said poppet valve being connected to said closure and guided thereby, said cylinder head having a recess therein at its upper edge, said control valve having an arm projecting laterally therefrom and extending through and beyond said recess, said control valve being, internally, entirely free from internal physical contact with any portion of the engine thereby eliminating any difficulty resulting from internal expansion of said control valve, said control valve and its arm being substantially of uniform thickness throughout their full extent, thereby facilitating the uniform distribution and dissipation of heat.

2. In an internal combustion engine, said engine comprising a cylinder head having inlet and exhaust ports in combination with a tubular solid cylindrical oscillatable control valve having inlet and exhaust ports complemental to said inlet and exhaust ports of said cylinder head, said cylinder head having a recessed portion defining an arcuate path of limited extent therein located in its upper end portion, said control valve having an arm on its upper portion extending laterally therefrom through said recess for oscillation therein, said control valve being externally machine finished and fitted coaxially within said cylinder head with sufficient clearance to be guided solely by the internal portion of said cylinder head, said control valve being entirely, internally, free and thereby being unaffected internally by any guiding control means for said valve, said control valve and its arm being substantially of uniform thickness throughout their full extent, thereby facilitating the uniform distribution and dissipation of heat.

3. In an internal combustion engine, the combination of a main cylinder having a cylinder head thereon coaxial with the main cylinder, said head comprising a casing constituting a control chamber above said main cylinder, said cylinder head having a detachable closure secured thereon and coaxial therewith, a port located at the junction of said cylinder and cylinder head, said port comprising a combined valve seat, intake and exhaust passage, in combination with a poppet valve to control the passage through said port, said chamber having a bearing therein depending centrally from said closure and secured thereto coaxially of said valve seat and cylinder, said poppet valve having a stem extending through said bearing to a position beyond said chamber and closure, said cylinder head having a recessed upper edge portion, in combination with an oscillatory, solid, cylindrical and tubular control valve located in said control chamber, said control valve having an arm on its upper end portion extending laterally therefrom through and beyond said recessed portion, said tubular control valve and its arm being of substantially uniform thickness throughout their full extent and being internally free from any guiding physically contacting surface portions of said engine, said control valve and cylinder head having cooperating intake and exhaust ports therein for synchronized control of the gases by said control valve, in combination with suitable mechanism to actuate both of said valves in synchronized relation.

4. The construction set forth in claim 3 in which said suitable mechanism comprises an auxiliary shaft having intergeared relation with a driving shaft, said auxiliary shaft having cam means thereon and said valves having connecting means extending to and engaging the cam means for synchronized operation of both of said valves.

5. In a high compression internal combustion engine, comprising a main cylinder and a cylinder head detachably secured thereon and coaxial with said main cylinder, a crank shaft, a crank shaft casing secured to said main cylinder a piston in said main cylinder and connected to said crank shaft, a poppet valve, a poppet valve seat comprising a port located at the junction of the main cylinder with the cylinder head, said cylinder head having a recessed portion in its upper end, a solid oscillatory tubular cylindrical control valve in said cylinder head, said control valve having a laterally extending arm on its uppermost portion said arm extending through and beyond said recessed portion of said head, said control valve and its arm being of substantially uniform thickness throughout its full extent, said control valve being entirely free internally from any guiding means or physical contact with any portion of said engine, said head and control valve having cooperating intake and exhaust ports controlled by said tubular control valve, a detachable closure for said head, said closure having a depending bearing extending centrally into said head, said poppet valve having a stem extending upwardly through said bearing and beyond the same, said poppet valve being spring biased to a seating position, mechanism operatively connected with both of said valves and crank shaft to actuate the same in synchronized operative relation, said piston being connected to said crank shaft in a critical position whereby high compression may be produced without preignition and thereby depending on a suitably located spark plug for regular ignition.

6. In an internal combustion engine, comprising a main cylinder head coaxially connected thereto, a closure detachably connected to said head coaxially thereof, an oscillatory valve, a poppet valve having a stem, and actuating mechanism for said valves, the lower portion of said cylinder head having in its lowermost portion a poppet valve seat, said seat comprising a combined intake and exhaust port, said cylinder head having in its uppermost portion a laterally extending recess, said cylinder head comprising a control chamber, said oscillatory valve having at its uppermost portion an arm thereon extending laterally therefrom through and beyond said recess, said oscillatory valve being located in said control chamber, said oscillatory valve and said cylinder head having respectively cooperating intake and exhaust ports, said oscillatory valve and its arm being of substantially uniform thickness throughout their full extent, said oscillatory valve being entirely free internally from any guides or physical contact of any portion of said engine, said poppet valve being spring biased to closed position, said actuating mechanism being operatively connected to driving means and to said valves respectively.

References Cited in the file of this patent

UNITED STATES PATENTS

| | | |
|---|---|---|
| 815,779 | Bailleul | Mar. 20, 1906 |
| 1,106,243 | Saussard | Aug. 4, 1914 |
| 1,155,297 | Bradley | Sept. 28, 1915 |
| 1,274,300 | McInturff | July 30, 1918 |
| 1,414,987 | Loeffler et al. | May 2, 1922 |
| 1,467,747 | Anderson et al. | Sept. 11, 1923 |
| 1,589,983 | Najder | June 22, 1926 |
| 1,688,741 | Najder | Oct. 23, 1928 |
| 1,913,224 | Wilkinson | June 6, 1933 |
| 1,928,411 | Cross | Sept. 26, 1933 |
| 2,170,619 | Sica | Aug. 22, 1939 |

FOREIGN PATENTS

| | | |
|---|---|---|
| 132,369 | Great Britain | Sept. 18, 1919 |
| 328,011 | Great Britain | Apr. 16, 1930 |